(12) United States Patent
Daily et al.

(10) Patent No.: US 11,098,784 B1
(45) Date of Patent: Aug. 24, 2021

(54) SHOCK MITIGATION UTILIZING QUIESCENT CAVITATION

(71) Applicants: David J Daily, Middletown, RI (US); Jesse L Belden, Barrington, RI (US); Aren M Hellum, Wakefield, RI (US); David N Beal, Providence, RI (US); Andrew N Guarendi, East Greenwich, RI (US)

(72) Inventors: David J Daily, Middletown, RI (US); Jesse L Belden, Barrington, RI (US); Aren M Hellum, Wakefield, RI (US); David N Beal, Providence, RI (US); Andrew N Guarendi, East Greenwich, RI (US)

(73) Assignee: The United States of America, as represented by the Secretary of the Navy

( * ) Notice: Subject to any disclaimer, the term of this patent is extended or adjusted under 35 U.S.C. 154(b) by 701 days.

(21) Appl. No.: 15/483,345

(22) Filed: Apr. 10, 2017

Related U.S. Application Data

(60) Provisional application No. 62/462,572, filed on Feb. 23, 2017.

(51) Int. Cl.
| | | |
|---|---|---|
| *F16F 9/05* | (2006.01) | |
| *F16F 9/512* | (2006.01) | |
| *F16F 9/00* | (2006.01) | |
| *F16F 9/32* | (2006.01) | |
| *F16F 9/36* | (2006.01) | |

(52) U.S. Cl.
CPC ............ *F16F 9/5126* (2013.01); *F16F 9/006* (2013.01); *F16F 9/3207* (2013.01); *F16F 9/36* (2013.01); *F16F 2222/12* (2013.01); *F16F 2230/12* (2013.01); *F16F 2230/30* (2013.01); *F16F 2232/08* (2013.01); *F16F 2234/02* (2013.01)

(58) Field of Classification Search
CPC .. F16F 9/5126; F16F 9/006; F16F 9/36; F16F 9/3207; F16F 2234/02; F16F 2232/08; F16F 2230/30; F16F 2222/12; F16F 2230/12
See application file for complete search history.

(56) References Cited

U.S. PATENT DOCUMENTS

| | | | | |
|---|---|---|---|---|
| 4,452,437 | A * | 6/1984 | Lochner | B60R 19/54 267/64.22 |
| 2002/0088676 | A1* | 7/2002 | Zehler | F16F 9/006 188/266 |
| 2005/0087410 | A1* | 4/2005 | Namuduri | F16F 9/36 188/267.2 |
| 2010/0016460 | A1* | 1/2010 | Qiao | F41H 5/00 521/149 |
| 2010/0193305 | A1* | 8/2010 | Suciu | F16F 9/003 188/268 |

(Continued)

*Primary Examiner* — Khaled Annis
(74) *Attorney, Agent, or Firm* — James M. Kasischke; Michael P. Stanley

(57) ABSTRACT

A shock mitigator is provided for mitigating physical shock to a joined object. The shock mitigator includes a hollow body capable of being affixed to the object and having two ends defining a volume therein. A cavitating liquid is disposed in the hollow body volume. At least one end cap is slidingly disposed within the hollow body to seal at least one end thereof. When exposed to a physical shock the cavitating liquid changes phase from a liquid to a vapor, absorbing energy from the shock.

9 Claims, 4 Drawing Sheets

(56) References Cited

U.S. PATENT DOCUMENTS

| | | | |
|---|---|---|---|
| 2012/0180200 A1* | 7/2012 | Gaudet | A42B 3/121 |
| | | | 2/411 |
| 2012/0186003 A1* | 7/2012 | Heger | A41D 13/015 |
| | | | 2/412 |
| 2012/0186923 A1* | 7/2012 | Burna | F16F 9/006 |
| | | | 188/268 |
| 2014/0163664 A1* | 6/2014 | Goldsmith | A61B 17/00491 |
| | | | 623/1.11 |
| 2015/0345585 A1* | 12/2015 | Gaudet | F41C 23/06 |
| | | | 42/74 |
| 2018/0179357 A1* | 6/2018 | Lu | C08J 9/008 |

* cited by examiner

SHOCK MITIGATION UTILIZING QUIESCENT CAVITATION

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention is directed to a device for mitigating physical shocks that utilizes quiescent cavitation to temporarily store impact energy and is further directed to a concussion mitigation helmet employing this device.

(2) Description of the Prior Art

A primary use of helmets is to shield the head from injuries caused by impact or sudden accelerations. It is well known in the art of helmet design to provide various types of impact absorbing material between an outer surface of a helmet and a wearer's head. When the helmet is subjected to an impact this material collapses to absorb energy from the impact and to distribute the energy over a wider surface area for a longer period of time.

Injuries can also occur from sudden acceleration or deceleration. A common traumatic brain injury is caused by what is called a "coup, contrecoup" impact. This injury occurs when the skull is suddenly decelerated bringing the head forward. The brain impacts the frontal area of the skull in what is referred to as the "coup" injury. The skull then rebounds backwards until the neck stops the head and the brain impacts the back of the skull resulting in the "contrecoup" injury. Existing helmets do not guard against accelerations that can cause injury.

Cavitation is the phase change of a liquid to its vapor state by lowering the pressure in the liquid below its vapor pressure. This commonly occurs on the low pressure side of propellers, pumps, and venturi nozzles and is predicted by the cavitation number as follows:

$$C = \frac{P_{local} - P_v}{\frac{1}{2}\rho V^2} \quad (1)$$

where $P_{local}$ is the local pressure, $P_v$ is the vapor pressure of the liquid which is needed to cause cavitation, $\rho$ is the density of the liquid, and $V$ is the velocity. Cavitation becomes likely when the cavitation number $C$ is below 1. When the cavitation number is above 1 cavitation is unlikely and the fluid remains as a liquid.

In the classic experiment of subjecting a liquid filled bottle to sudden acceleration, it is observed that this causes cavitation bubbles at the bottom of the bottle. The bubbles collapse with sufficient force to shatter glass bottles. FIG. 1 is a diagram illustrating cavitation produced by acceleration. A cylinder 10 sealed at a bottom 12 and a top 14. The interior of cylinder 10 is filled with a liquid 16. Cylinder 10 has a column height given by h. The top region is filled with a gas 18 having a pressure $P_{surface}$. $P_v$ is the vapor pressure at the bottom 20 of the column of liquid 16. An x-y coordinate axis is provided for reference. Arrow 22 shows a velocity $v_y$ in the y direction. An acceleration occurs in the direction shown by arrow 24. Upon subjecting cylinder 10 to a sudden acceleration, the kinetic energy of the accelerated liquid column 16 is converted into potential energy in the form of cavitation bubbles 26. This slows the acceleration until collapse of the cavitation bubbles 26.

It is thus desirable to have a means for delaying and dissipating physical shocks that is passive and compact.

SUMMARY OF THE INVENTION

It is a first object of the present invention to mitigate physical shock applied to a joined object.

Another object is to provide shock mitigation with a passive system.

Yet another object is to provide shock mitigation to a variety of different objects.

Accordingly, there is provided a shock mitigator for mitigating physical shock to a joined object. The shock mitigator includes a hollow body capable of being affixed to the object and having two ends defining a volume therein. A cavitating liquid is disposed in the hollow body volume. At least one end cap is slidingly disposed within the hollow body to seal at least one end thereof. When exposed to a physical shock the cavitating liquid changes phase from a liquid to a vapor, absorbing energy from the shock.

BRIEF DESCRIPTION OF THE DRAWINGS

Reference is made to the accompanying drawings in which are shown an illustrative embodiment of the invention, wherein corresponding reference characters indicate corresponding parts, and wherein.

DETAILED DESCRIPTION OF THE INVENTION

Figure 1:
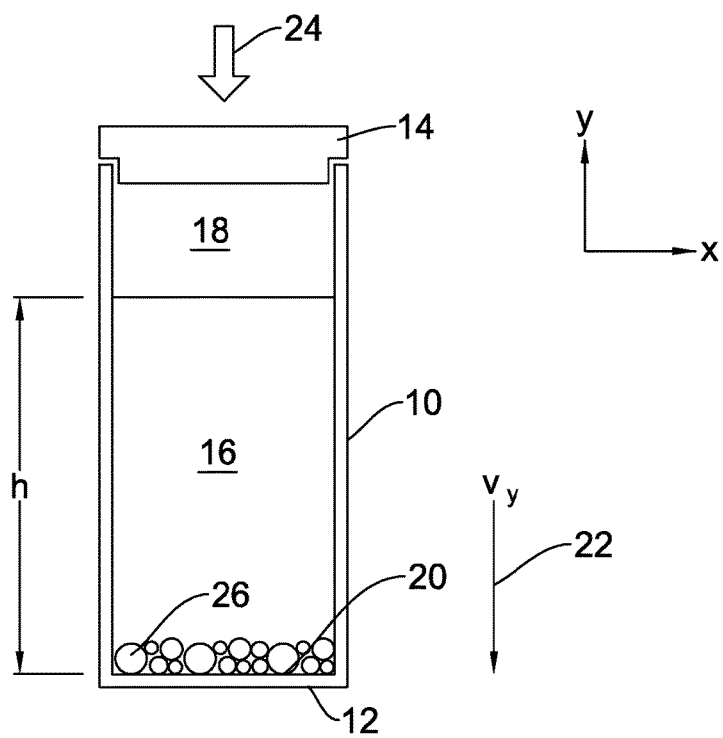
FIG. 1 is a diagram showing cavitation of a fluid when subjected to sudden acceleration.

In order to use the energy storage capacity of potential energy stored in cavitation bubbles, it is desirable to characterize the onset of cavitation caused by acceleration. This can be done by utilizing the incompressible Navier-Stokes in the y-direction and continuity equations to describe the system of FIG. 1:

$$\rho\left(\frac{\partial u_y}{\partial t} + u_x\frac{\partial u_y}{\partial x} + u_y\frac{\partial u_y}{\partial y} + u_z\frac{\partial u_y}{\partial z}\right) = \\ -\frac{\partial P}{\partial y} + \mu\left(\frac{\partial^2 u_y}{\partial x^2} + \frac{\partial^2 u_y}{\partial y^2} + \frac{\partial^2 u_y}{\partial w^2}\right) + \rho g_y \quad (2)$$

-continued $$\frac{\partial u_x}{\partial x} + \frac{\partial u_y}{\partial y} + \frac{\partial u_z}{\partial z} = 0$$

In this equation u is a velocity vector, µ is viscosity, and $g_y$ is gravity. Assuming that the fluid is inviscid and that all the fluid flow is in the vertical direction gives the following equation:

$$\mu = 0, u_x = 0, u_z = 0, \therefore \frac{\partial u_y}{\partial y} = 0 \qquad (3)$$

This allows simplification of equation (2) to give:

$$-\rho \frac{\partial u_y}{\partial t} = -\frac{\partial P}{\partial y} - \rho g_y \qquad (4)$$

Defining $$\frac{\partial u_y}{\partial t} = a,$$

ignoring gravity and using finite difference to simplify the remaining terms, gives a cavitation number for accelerations Ca described as:

$$Ca = \frac{P_{local} - P_v}{\rho a h} \qquad (5)$$

This number can be used with the knowledge that values below 1 indicate accelerations that are likely to cause cavitation bubbles.

Figure 2:
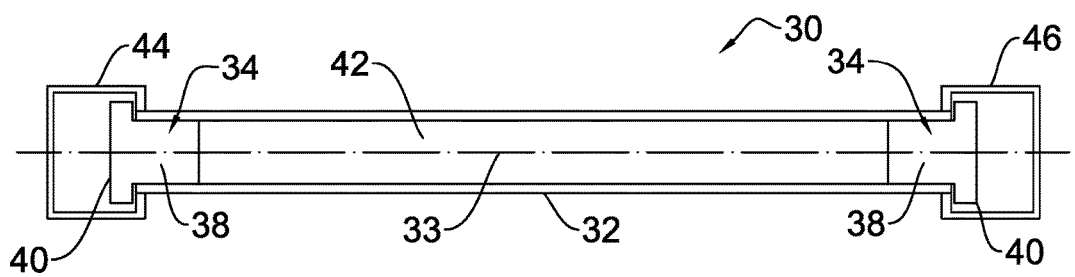
FIG. 2 is a diagram displaying a shock mitigator in accordance with a first embodiment of the present invention.

With knowledge of this acceleration cavitation number, Ca, a shock mitigator 30 is provided as shown in FIG. 2. In a basic form shock mitigator 30 includes a linearly extending hollow body 32. Preferably, hollow body 32 will extend along axis 33 in the direction of the anticipated shock because of dependence of equation (5) on column height h. Hollow body 32 is sealed on either end by end caps 34 and 36. Hollow body 32 is preferably made from a rigid, lightweight material such as polycarbonate; however, other materials can be used. Hollow body 32 should be sufficiently large in cross-section to allow inertia to dominate capillary effects.

End caps 34 are sealed against the interior of hollow body 32 and are slidable within hollow body 32. End caps 34 each have a sliding body 38 and a head 40. Sliding body 38 is positioned within hollow body 32. Head 40 is sized to interfere with hollow body 32 in order to prevent end caps 34 from sliding fully within hollow body 32. End caps 34 can be made from polycarbonate or another material. Density of the end caps 34 can be selected to influence cavitation.

A cavitation liquid 42 is positioned within the interior of hollow body 32 and retained by end caps 34. Cavitation liquid 42 can be any liquid having an appropriate vapor pressure, $P_v$, and density ρ for cavitating when subjected to an expected acceleration. At ordinary temperatures and pressures, it is believed that degassed water is suitable; however, other liquids such as corn syrup, ethanol or mineral oil can be utilized.

Retaining housings 44 and 46 can be provided at the ends of hollow body 32 around end caps 34. Retaining housings 44 and 46 are optional but can serve several purposes. Primarily, these are provided in order to restrain end caps 34 from excessive travel within hollow body 32. It is expected that end caps 34 will generally be retained within hollow body 32 by hydrodynamic forces created by the seal between end caps 34 and hollow body 32. Retaining housings 44 and 46 also serve to prevent mechanical interference with end caps 34 by other objects. Additionally, housings 44 and 46 can act to seal the ends of hollow body 32. This will allow maintenance of a pressurized environment at these ends to further tailor cavitation characteristics. Sealed ends also protect against cavitation liquid leakage or from environmental fluids entry. While retaining housings 44 and 46 can seal the region around end caps and hollow body, these can also be open structures such as cages or other structures.

Figure 3:
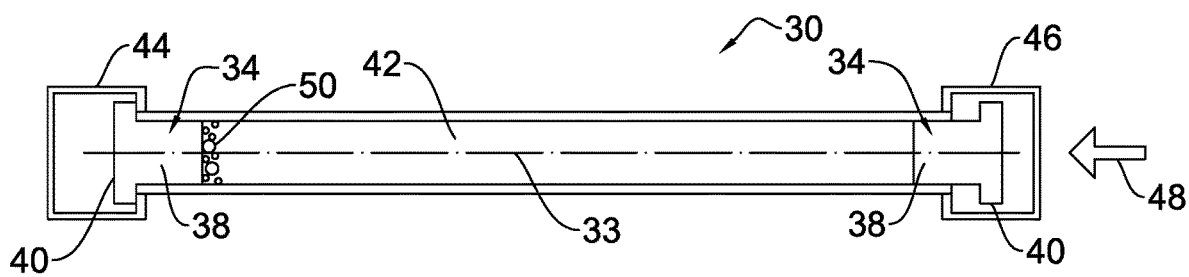
FIG. 3 is a diagram showing the shock mitigator of FIG. 2 when subjected to a physical shock.

FIG. 3 shows the embodiment of FIG. 2 when subjected to an acceleration impulse given by arrow 48. Acceleration 48 causes movement of hollow body 32 and retaining housings 44 and 46 to the right along the anticipated shock axis 33. End cap 34 on the left side is further seated into hollow body 32 by its inertia and by a suction created at the surface between cavitation liquid 42 and the end of sliding body 38. Cavitation liquid 42 resists acceleration 48 by its inertia, but at region 50 the movement of end cap 34 and the inertia of the cavitation liquid 42 causes a pressure drop inducing cavitation. End cap 34 on the right slides outward from hollow body 32 because of its inertia. Sliding of end cap 34 allows movement of cavitation liquid 42 in order to create the pressure drop at region 50.

Cavitation in region 50 stores the impulsive kinetic energy given by acceleration 48 as phase change potential energy. This acts to provide an inertial force resisting acceleration impulse 48. Upon termination of impulse 48, cavitation bubbles collapse back into liquid and equilibrium is restored. This acts to increase the duration of the acceleration impulse and mitigate it.

Figure 4:
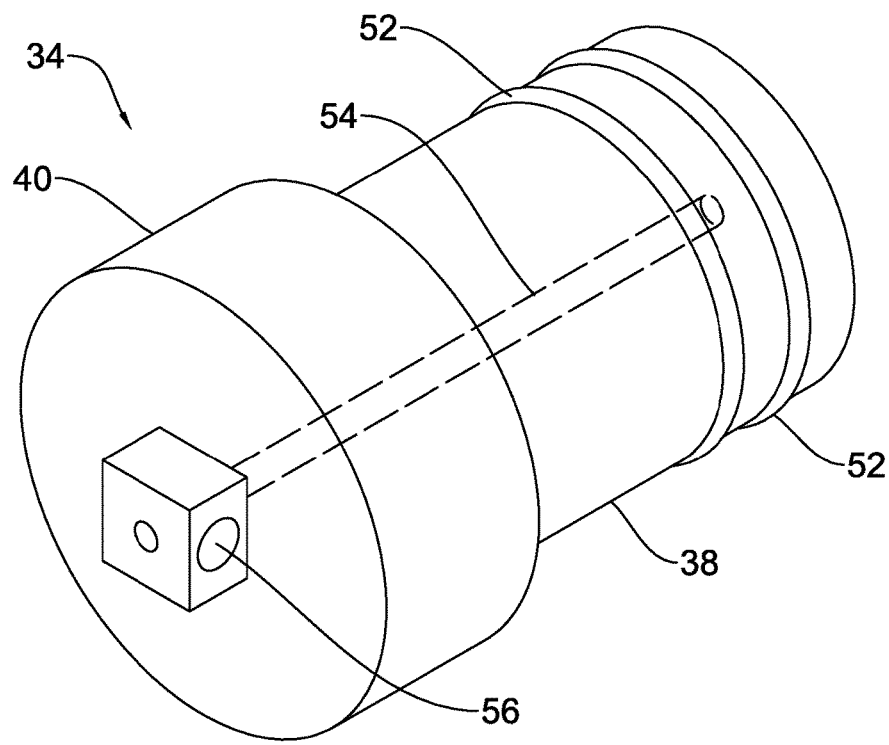
FIG. 4 is a perspective view of an end cap in accordance with a first embodiment of the invention.

FIG. 4 shows an embodiment of an end cap such as 34. As described above, end cap 34 has a sliding body 38 and a head 40. Head 40 has a larger mean diameter than sliding body 38 so that it will interfere with hollow body 32 as shown in FIGS. 2 and 3. Sliding body 38 can have at least one seal 52. This seal 52 can be any of a number of well-known sealing means capable of providing a sliding seal. These include seals such as a piston ring arrangement, an o-ring seated in a seal groove or another sliding seal known in the art. In a preferred embodiment at least two seals 52 are provided to give end cap 34 stability as it slides in hollow body 32. (See FIG. 3.) This embodiment also features a bleed channel 54 providing a path for fluid communication between the interior of hollow body 32 and the exterior. Bleed channel 54 can be sealed with a plug 56. Bleed channel 54 allows insertion of end cap 34 after filling of hollow body 32 with cavitation liquid 42. Gasses in cavitation liquid 42 can also be bled through bleed channel 54 and sealed with plug 56.

Figure 5:
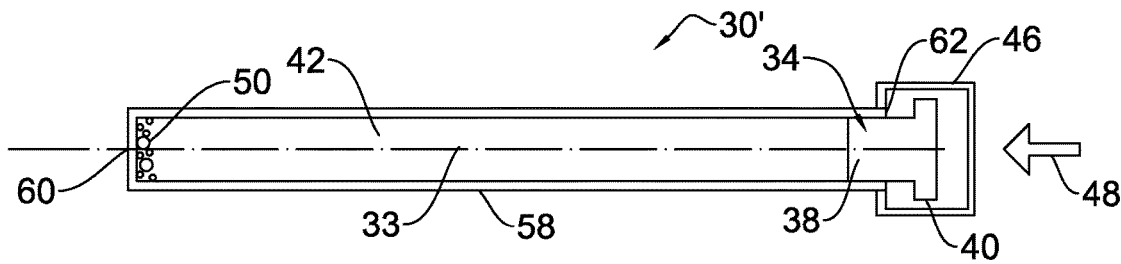
FIG. 5 is a second embodiment of the invention.

FIG. 5 shows an alternate embodiment of the shock mitigator 30' wherein a hollow body 58 is provided having a sealed end 60 and an open end 62. As before, an end cap 34 is slidably positioned in hollow body 58 open end 62. End cap 34 has a head 40 and sliding body 38 as previously described. A sufficient acceleration impulse in the direction shown by arrow 48 causes cavitation bubbles 50 to form in the cavitation liquid adjacent to sealed end 60. End cap 34 slides outward because of its inertia and the inertia of cavitation liquid 42 in hollow body 58. As before, end cap 34 can be retained by a retaining housing 46. This embodiment is much the same as the previously described embodiment, but it only acts as shock mitigation from a single direction rather than bi-directionally.

Figure 6:
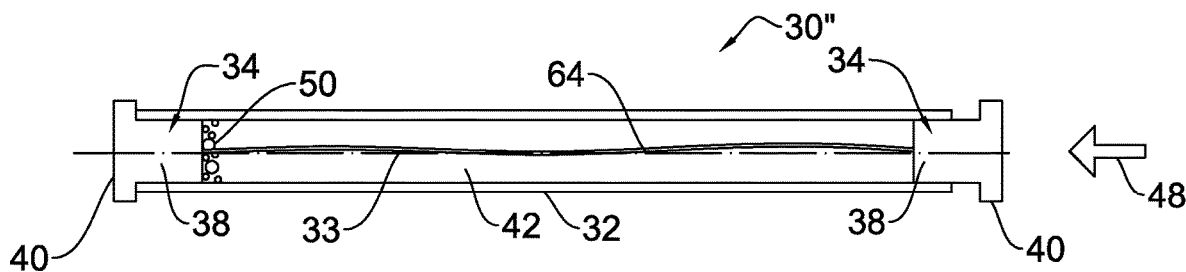
FIG. 6 is a third embodiment of the invention.

FIG. 6 provides another alternate embodiment of shock mitigator 30″. In this embodiment, retaining housings are omitted. End caps 34 are retained within hollow body 32 by a tether 64 extending between the end cap 34 on the right and end cap 34 on the left. Each end cap 34 can be joined to tether 64 by any means known in the art. Tether 64 prevents one or both end caps 34 from sliding fully out of hollow body 32. Tether 64 can be made from a resilient material such as nylon that allows removal of end cap 34 from hollow body 32 by application of force. A similar arrangement can be devised for the embodiment shown in FIG. 5. End caps 34 can be retained by set screws passing through hollow body 32 in order to interfere with end cap 34, preventing excessive axial movement.

Shock mitigators 30 can be curved. This allows the mitigator to be contoured to the applied object. A 1/radius dependency is provided in the Navier-Stokes equation in cylindrical coordinates:

$$\rho\left(\frac{\partial u_\phi}{\partial t} + u_r \frac{\partial u_r}{\partial r} + \frac{u_\phi}{r}\frac{\partial u_\phi}{\partial \phi} + u_z \frac{\partial u_\phi}{\partial z} + \frac{u_r u_\phi}{r}\right) = \quad (6)$$
$$-\frac{1}{r}\frac{\partial p}{\partial \phi} + \mu\left(\frac{1}{r}\frac{\partial}{\partial r}\left(r\frac{\partial u_\phi}{\partial r}\right) + \frac{1}{r^2}\frac{\partial^2 u_\phi}{\partial \phi^2} + \frac{\partial^2 u_\phi}{\partial z^2} + \frac{2}{r^2}\frac{\partial u_r}{\partial \phi} - \frac{u_\phi}{r^2}\right) + \rho g_\phi$$

An assumption can be made that there will be no velocity in the radial direction ($u_r=0$), and that the radial velocity does not change as a function of radial angle $$\left(\frac{\partial u_\phi}{\partial \phi} = 0\right),$$

giving:

$$\rho\left(\frac{\partial u_\phi}{\partial t}\right) = -\frac{1}{r}\frac{\partial p}{\partial \phi} \quad (7)$$

Setting the derivative of radial velocity with respect to time equal to the radial acceleration, and simplifying the derivative of pressure with respect to change in angle utilizing the finite difference method gives:

$$1 = \frac{1}{\rho a_\phi r}\frac{\Delta P}{\Delta \phi} \quad (8)$$

It can be seen that this result is similar to the linear quiescent cavitation number with the exception of 1/r. The further the curved mitigator is from the center of rotation, the more movement the tube will undergo, increasing cavitation potential.

Figure 7:
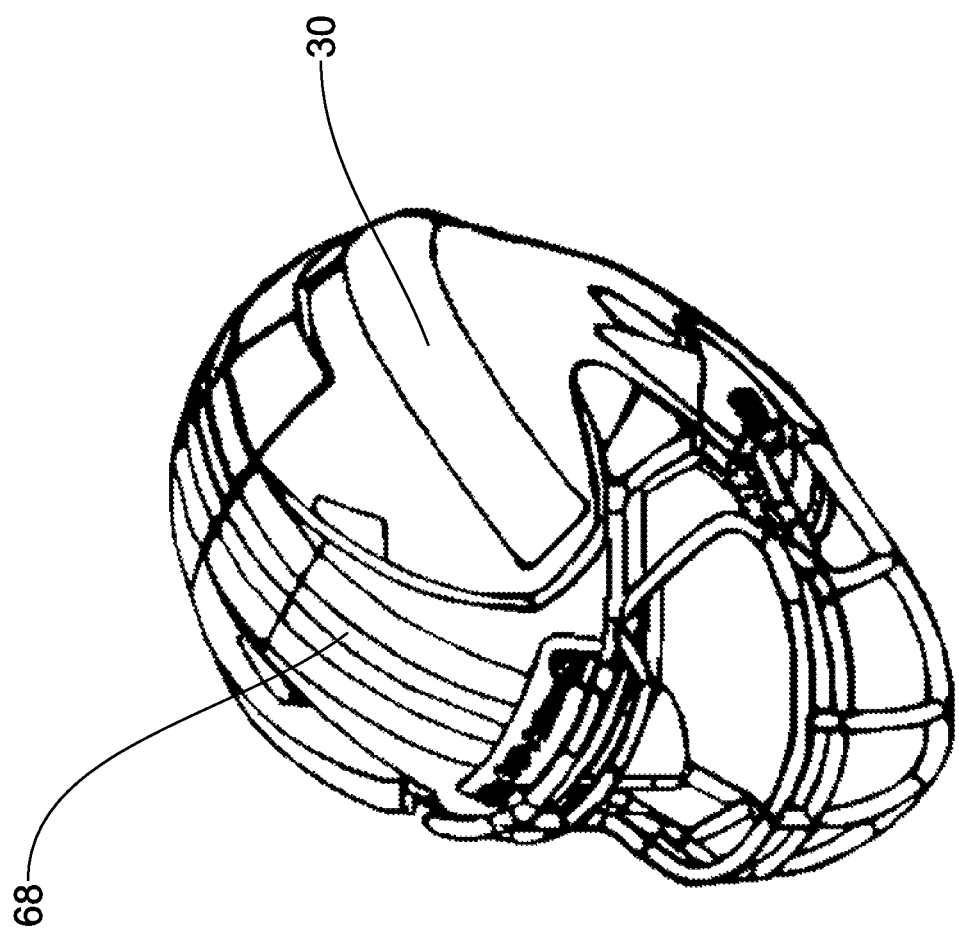
FIG. 7 shows positioning of the shock mitigator in a first embodiment of a helmet.

FIG. 7 shows an application of shock mitigators 30 having curved configurations in order to guard against shocks to a helmet 68. The embodiment of FIG. 7 provides shock mitigators 30 arranged to maximize protection against ventral dorsal neck rotation. Shock mitigators 30 in this embodiment are curved tubes positioned along the outer shell of the helmet 68. Multiple mitigators 30 are installed for absorbing more energy during impact. This design utilizes two elliptical mitigators 30 mounted flush to the surface of the helmet. Mitigators 30 have a linear dimension of 8.5 inches with cross-section of the ellipse being 2 inches in the major axis and 0.9 inches in the minor axis. Penetration of the mitigators into the helmet is minimal allowing for traditional padding to be placed inside the helmet and protect the head from impacting the mitigator itself. This design has an added benefit in that it can protect the head from multiple axes of rotation due to the placement of the mitigators. Furthermore, with multiple mitigators, the mitigators could be tuned so that one mitigator would cavitate before the other which would help to protect the player from different levels of impact.

Figure 8:
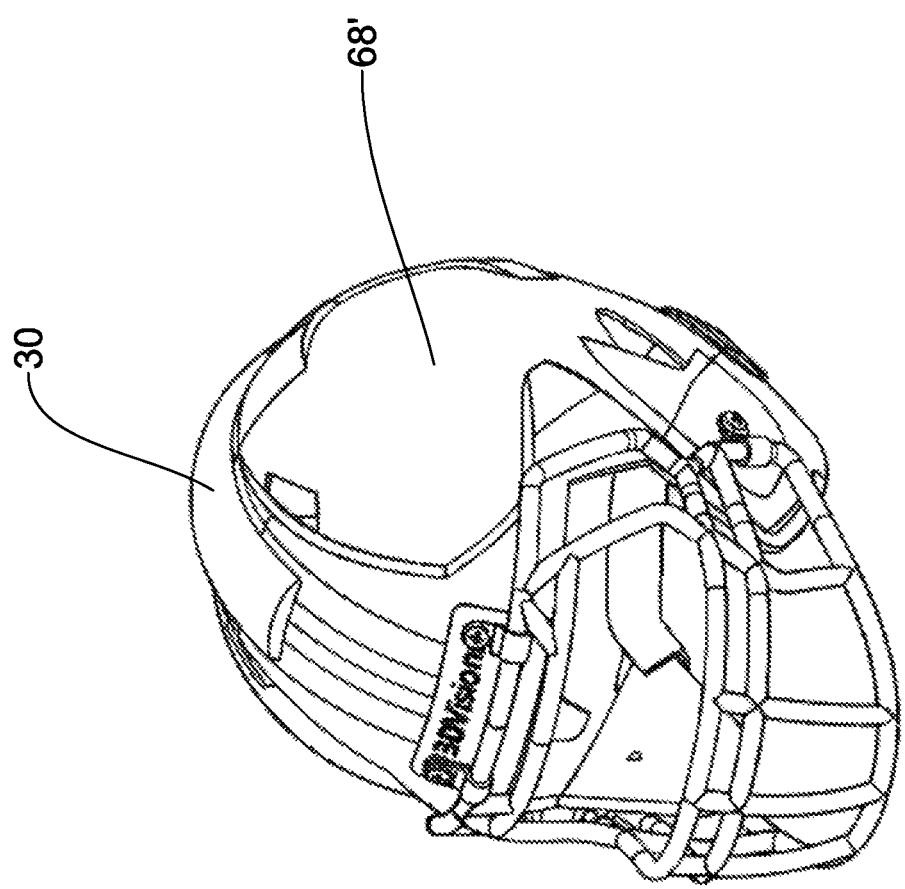
FIG. 8 shows a second embodiment of shock mitigators on a helmet.

FIG. 8 shows another embodiment of a helmet fitted with a shock mitigator 30. This embodiment uses a shock mitigator running along the top of the helmet to the back of the head. The mitigator 30 is placed as far away from the axis of rotation of the neck as possible. This maximizes the effectiveness of the mitigator. The cross section of the hollow body is elliptical with a linear length of 7 inches. In this embodiment, it is important that the mitigator remain clear of the area of the helmet that protects the player's forehead. This area has been known to be an area of high impact with football players. The mitigator should avoid being placed in this area to keep the mitigator from being hit directly and causing the tube to be driven into the head of the player. As can be seen, mitigator 30 can be provided in a variety of configurations in order to guard from anticipated accelerations.

Quiescent cavitation is dependent on the pressure inside the tube, the length of the tube, and the vapor pressure of the liquid being used. These three variables can be altered to make the mitigators cavitate at lower or higher accelerations. This is important because the tubes can be set to cavitate at lower accelerations for helmets having different purposes and users.

Shock mitigators such as those described herein could be installed in a variety of different applications. One such application includes automotive applications to absorb impact energy during a collision. One or more mitigators could be installed along the longitudinal access of the vehicle near the under carriage. During impact, the tube would cavitate temporarily, converting energy into cavitation bubbles before converting the energy back into kinetic energy.

Another likely application is for shock hardening equipment. Shock mitigators such as those described herein could be retrofit on existing equipment to absorb impact energy and make grade B equipment shock hardened to grade A.

It will be understood that many additional changes in the details, materials, steps and arrangement of parts, which have been herein described and illustrated in order to explain the nature of the invention, may be made by those skilled in the art within the principle and scope of the invention as expressed in the appended claims. For example, hollow body can have a geometric configuration that causes an enhanced pressure drop at a chosen area resulting in cavitation at a lower acceleration.

The foregoing description of the preferred embodiments of the invention has been presented for purposes of illustration and description only. It is not intended to be exhaustive, nor to limit the invention to the precise form disclosed. Obviously, many modifications and variations are possible in light of the above teaching. Such modifications and variations that may be apparent to a person skilled in the art are intended to be included within the scope of this invention as defined by the accompanying claims.

What is claimed is:

1. A shock mitigator for mitigating physical shock to a joined object comprising:
    a hollow body capable of being affixed to the object having a first end and a second end and defining a volume therein;
    a cavitating liquid disposed in said hollow body volume; and
    at least one end cap slidingly disposed within said hollow body to seal at least one end of said hollow body;
    means for retaining said at least one end cap to allow said at least one end cap to slide within said hollow body and to retain said end cap within said hollow body;
    wherein said cavitating liquid is capable of mitigating physical shock by changing phase from a liquid phase to a vapor phase when the shock mitigator is subjected to a physical shock.

2. The device of claim 1 wherein said means for retaining comprises a housing positioned about said at least one end cap and joined to said hollow body at least one end of said hollow body.

3. The device of claim 1 wherein said means for retaining comprises a tether joined between said at least one end cap and said hollow body.

4. The device of claim 1 wherein said cavitating liquid completely fills said hollow body volume.

5. The device of claim 4 wherein said cavitating liquid is degassed water.

6. A shock mitigator for mitigating physical shock to a joined object comprising:
    a hollow body capable of being affixed to the object having a first end and a second end and defining a volume therein;
    a cavitating liquid disposed in said hollow body volume; and
    two end caps with each end cap being slidably disposed within each end of said hollow body, each said end cap being capable of sealing the associated end of said hollow body;
    wherein said cavitating liquid is capable of mitigating physical shock by changing phase from a liquid phase to a vapor phase when the shock mitigator is subjected to a physical shock.

7. The device of claim 6 further comprising a tether disposed between said two end caps through the volume within said hollow body for restricting slidable movement of one end cap with respect to the other to retain both end caps within said hollow body.

8. The device of claim 6 wherein said cavitating liquid completely fills said hollow body volume.

9. The device of claim 8 wherein said cavitating liquid is degassed water.

* * * * *